United States Patent [19]
Smutny et al.

[11] 3,799,608
[45] Mar. 26, 1974

[54] PORTABLE BLIND

[76] Inventors: Frank D. Smutny, 206 S. Wainswright; Maurice M. Hassenplug, 1723 N. Park, both of Grand Island, Nebr. 68801

[22] Filed: Aug. 30, 1972

[21] Appl. No.: 285,028

[52] U.S. Cl. ............................... 297/184, 135/4 R
[51] Int. Cl. ........................ A45f 1/00, A47c 29/00
[58] Field of Search ................... 43/1; 135/1 R, 4 R; 297/184

[56] References Cited
UNITED STATES PATENTS

| | | | |
|---|---|---|---|
| 2,268,281 | 12/1941 | DeTosto | 135/4 R |
| 3,027,189 | 3/1962 | Scott | 297/184 |
| 3,642,318 | 2/1972 | Avant | 297/184 |
| 3,509,891 | 5/1970 | DeBolt | 135/4 R |
| 2,159,273 | 5/1939 | Killinger | 135/1 R |

*Primary Examiner*—Louis G. Mancene
*Assistant Examiner*—Daniel J. Leach
*Attorney, Agent, or Firm*—Zarley, McKee & Thomte

[57] ABSTRACT

A portable blind is disclosed generally comprising a collapsible frame means having a folding seat provided therein to accommodate the hunter in a sitting position. The lower portion of the frame means is covered with a camouflage material while the upper portion of the frame means is covered with a net-like material which permits the hunter to see therethrough. The lower camouflage material comprises a pair of front flap members which have registering grommets. The net-like material includes a moveable top portion having elastic means thereon for moving the top portion from a closed position to an open position to enable the hunter to stand up in the blind for shooting purposes. An arcuate hook element is mounted on the lower forward end of the top portion of the net-like material and is extended through the registering grommets for selectively maintaining the blind in a closed position. The hunter may open the blind by simply moving the hook out of engagement with the registering grommets which causes the front flap members to partially open and which permits the top portion to move to its open position. The frame means and the camouflage material thereon may be folded to a substantially flat position for carrying purposes.

10 Claims, 8 Drawing Figures

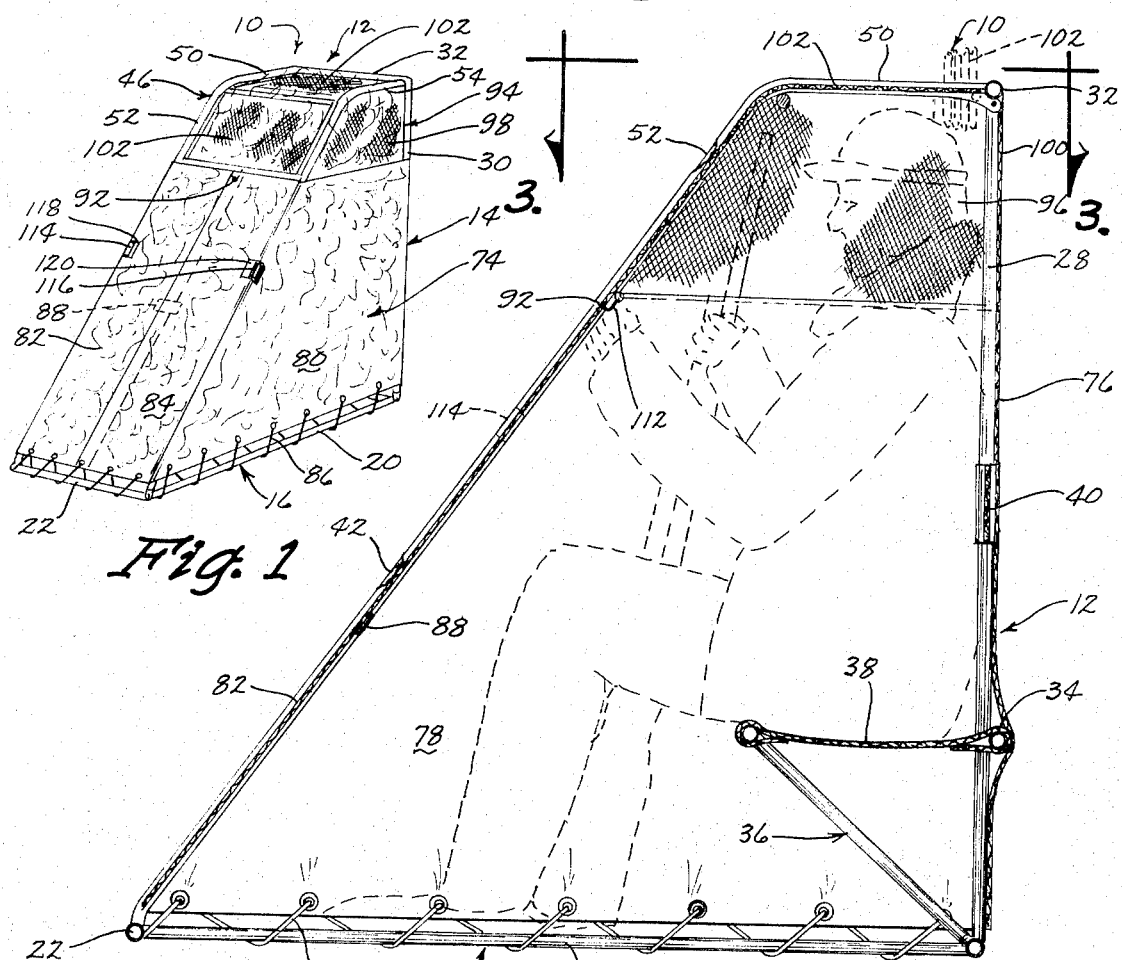

PORTABLE BLIND

A principal object of this invention is to provide a portable blind.

A further object of this invention is to provide a portable blind which may be easily folded and carried by the hunter from one place to another.

A further object of this invention is to provide a portable blind having a folding seat provided therein.

A further object of this invention is to provide a portable blind having a quick release means provided thereon for quickly opening the blind to permit the hunter to shoot.

A further object of this invention is to provide a portable blind which affords the hunter good visibility.

A further object of this invention is to provide a portable blind which is lightweight.

A further object of this invention is to provide a portable blind which is easily assembled.

A further object of this invention is to provide a portable blind which will be very stable when in its assembled condition.

A further object of this invention is to provide a portable blind which is economical in manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a front perspective view of the blind of this invention;

FIG. 2 is a side view of the blind;

FIG. 3 is an enlarged partial sectional view as seen along lines 3—3 of FIG. 2;

FIG. 4 is a front perspective view similar to FIG. 1 except that the blind is illustrated in its open position;

FIG. 5 is a side view illustrating the frame of the blind in a collapsed position;

Figure 6:
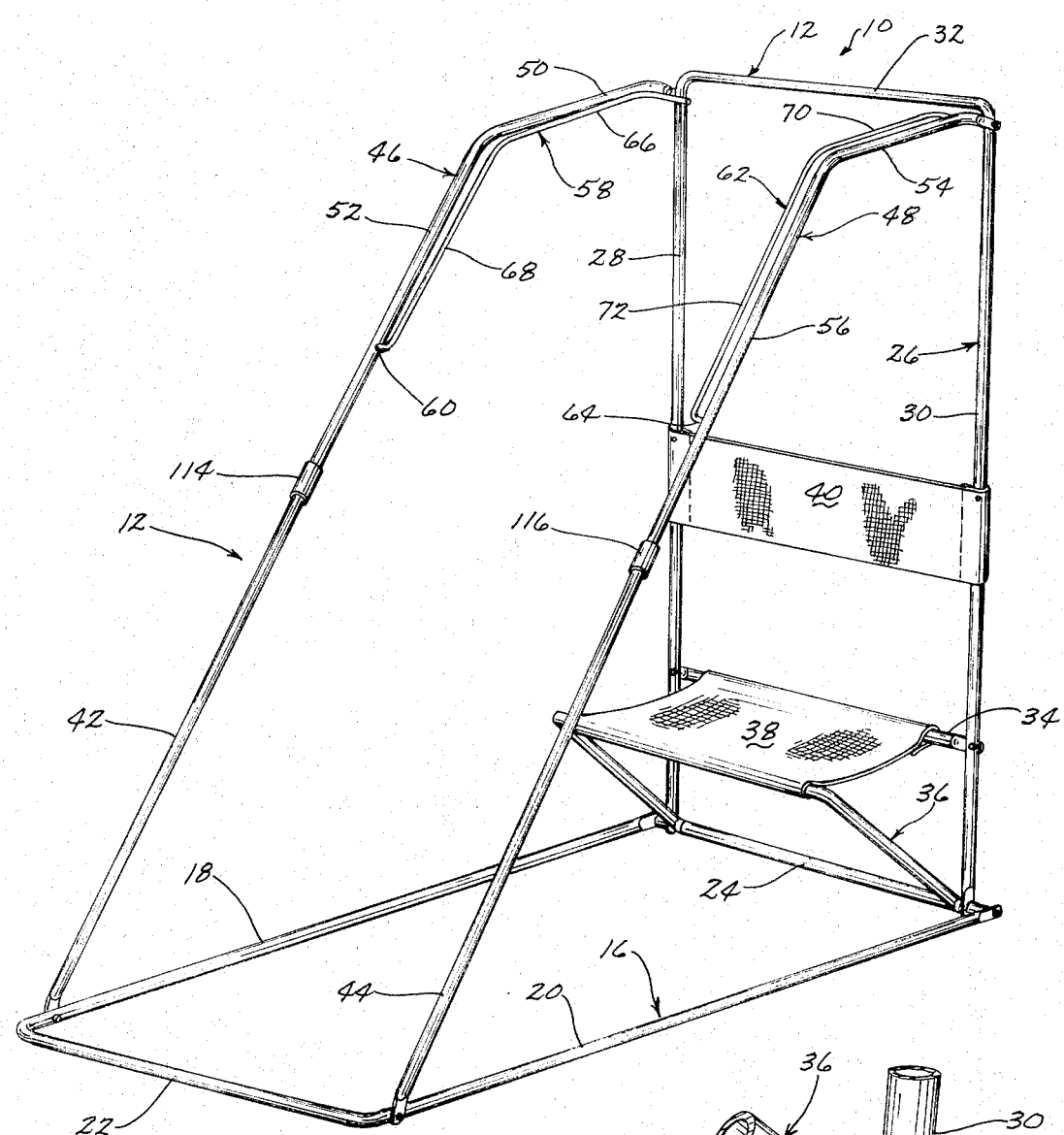
FIG. 6 is a front perspective view of the frame of the blind.
Figure 8:
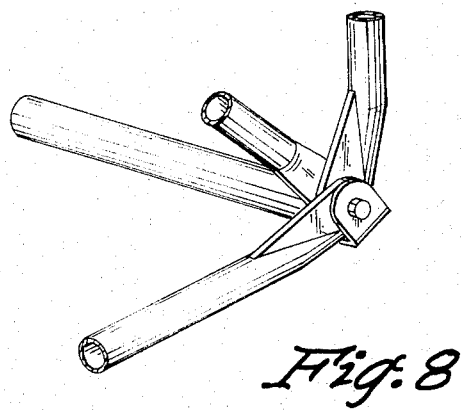
FIG. 8 is a view similar to FIG. 7 except that a modified means for joining the frame members is illustrated.
Figure 7:
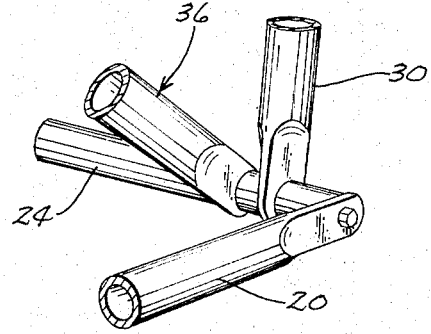
FIG. 7 is a partial perspective view illustrating the manner in which the portion of the frame is joined.

The numeral 10 generally designates the portable blind of this invention which generally comprises a foldable or collapsible frame means 12 having camouflage material 14 thereon. Frame means 12 comprises a U-shaped bottom frame member 16 having side frame portions 18, 20 and front frame portion 22. A rear frame member 24 is pivotally secured at its ends to the ends of bottom frame member 16 as seen in FIG. 6 and in FIG. 7. A U-shaped back frame member 26 is provided and comprises side frame portions 28, 30 and top frame portion 32. The lower ends of side frame portions 28 and 30 are pivotally connected to the rearward ends of frame portions 18 and 20, respectively.

Brace 34 is secured to side frame portions 28 and 30 and extends therebetween above the lower ends thereof. U-shaped frame member 36 is pivoted at its ends to frame member 24 as also seen in FIG. 6. Flexible material, such as canvas or the like, is secured at its ends to brace 34 and frame member 36 (FIG. 6) to form a folding seat 38. Flexible material, such as canvas or the like, is secured at its ends to frame portions 28 and 30 (FIG. 6) to form a back rest 40 for the seat 38.

Frame members 42 and 44 are pivoted at their lower ends to frame portions 18 and 20 respectively. Frame members 46 and 48 are pivoted at their upper ends to frame portions 28 and 30 respectively. For purposes of description, frame member 46 will be described as comprising a top portion 50 and front portion 52 while frame member 48 will be described as comprising a top portion 54 and front portion 56.

A slide member 58 is secured at its upper end to the upper end of the frame portion 28 and is secured at its lower end to front portion 52 at 60. Likewise, slide member 62 is secured at its upper end to frame portion 30 and is secured at its lower end to front portion 56 at 64. As seen in FIG. 6, the slide members are spaced from the frame members 46 and 48. For purposes of description, slide member 58 will be described as comprising a top portion 66 and a front portion 68 while slide member 62 will be described as comprising a top portion 70 and a front portion 72.

Camouflage material 14 generally comprises a cloth-type camouflage material which extends around the lower end of the frame means 12 as illustrated in FIG. 1 and also comprising a net-like material 94 at the upper end of the frame means. For purposes of description, material 74 will be described as comprising a back portion 76, side portions 78 and 80, and front flap portions 82 and 84. The lower ends of back portion 76, side portions 78 and 80, and front flap portions 82 and 84 are secured to the frame means by rope 86 or the like as illustrated in FIG. 2. The lower inner ends of front flap portions 78 and 80 are joined by rope 86 as illustrated in FIG. 4. A suitable fastening means 88 is provided on the inner edges of front flap portions 82 and 84 for detachably joining the same as seen in FIGS. 1 and 4. The fastening means 88 is preferably comprised of Velcro or the like. The upper inner ends of front flap portions 82 and 84 have grommets 90 and 92 provided thereon respectively which may be placed in a registering position as seen in FIG. 3.

As previously stated, the numeral 94 refers to a net-like material which is secured to the upper end of material 74 and which extends over the upper end of the frame means as seen in FIG. 1. The material 94 is designed to permit the hunter to see therethrough while still being camouflaged from the game. For purposes of description, material 94 will be described as comprising side portions 96 and 98, back portion 100 and top portion 102.

Top portion 102 has a plurality of bars 104 secured thereto which extend thereacross as seen in FIG. 3. The ends of the bars 104 have eyes 106 secured thereto which are slidably mounted on the slide members 58 and 62. An elongated strip of elastic 110 is secured to top portion 102 adjacent each of its sides and extends between the top frame portion 32 and the forwardmost bar 104 to yieldably resist the closing movement of the top portion 102.

An arcuate hook 112 is secured to the forwardmost bar 104 (FIG. 3) and is adapted to have its arcuate free end extended through the registering grommets 90 and 92 at times. In such a position, the hook 112 maintains the front flap portions 82 and 84 in a closed position and maintains the top portion 102 in the closed position of FIG. 3. A simple pull on the hook 112 causes the arcuate free end thereof to disengage from the grommets 90 and 92. When the hook 112 is disengaged from the grommets 90 and 92, the elastic strips 110 cause the top portion 102 to move upwardly and rearwardly on the slide members 58 and 62 to the position of FIG. 4. The upper ends of front flap portions 82 and 84 also separate to give additional maneuvering room to the hunter.

As illustrated in FIG. 6, frame member 42 is comprised of two separate frame members, the ends of which are detachably joined by a sleeve or collar 114. Likewise, a sleeve or collar 116 is provided on the frame member 44. The camouflage material 14 is provided with a pair of cut-out portions 118 and 120 to provide access to the sleeves 114 and 116.

Assuming that the portable blind is in its folded position, the normal method of assembly is as follows. The rear frame member 24 is pivotally moved upwardly to a vertical position. The frame member 42 is then pivotally moved so that its ends are in registering alignment. When the ends of frame member 42 are in alignment, the sleeve 114 is slidably moved thereover which maintains the frame member 42 in the position illustrated in FIG. 6. Frame member 44 is pivotally moved so that its ends are in an aligned relationship to permit the sleeve 116 to be slidably moved thereover to maintain the frame member 44 in the position of FIG. 6.

The hunter may then enter the interior of the blind between the front flap portions 82 and 84. The front flap portions 82 and 84 would then be partially closed through the use of the fastening means 88. The hunter would then unfold the seat and sit thereon as illustrated in FIG. 2. The hunter then pulls the top portion 102 from the position illustrated by broken lines in FIG. 2 to the position illustrated in FIG. 3 against the resiliency or elasticity of the strips 110. The upper ends of the front flap portions 82 and 84 are overlapped so that the grommets 90 and 92 are in their registering positions. The hook 112 is then extended through the registering grommets 90 and 92. With the hook 112 received by the grommets 90 and 92, the upper end of the front flap portions 82 and 84 are closed and the top portion 102 is also maintained in its closed position.

The hunter can readily observe the movement of game through the material 94. When the hunter desires to shoot, he simply pulls on the hook 112 to cause the hook 112 to disengage from the grommets 90 and 92 which causes the top portion 102 to slidably move upwardly and rearwardly on the slide members 58 and 62 to the open position. The upper inner ends of the front flap portions 82 and 84 also partially separate to provide sufficient maneuvering room to the hunter. The hunter may then stand and shoot in the fashion illustrated in FIG. 4.

The hook 112 provides a quick release means for the blind which permits the hunter to quickly get into position to shoot the game. In the position of FIG. 1, the hunter is well camouflaged and can readily observe the movement of game. The blind may be opened from the position of FIG. 1 to the position of FIG. 4 in a rapid manner to enable the hunter to shoot at the game without delay.

The blind may be folded from the assembled position of FIG. 1 to a folded position by simply reversing the procedure outlined above. It is not necessary to remove the camouflage material from the frame means during the folding or unfolding operation. The hunter may easily carry the folded blind to his automobile or to another hunting location.

It should be understood that the blind will work adequately without the camouflage material 74 thereon since reeds, weeds, etc., may be used for natural camouflage. The relationship of the seat with the respect to the blind is quite important in that it will enable the hunter to be completely positioned within the frame means and also enables the hunter to suspend his posterior above the wet and marshy conditions ordinarily found in most hunting locations.

Thus it can be seen that a very novel portable blind has been disclosed herein which accomplishes at least all of its stated objectives.

We claim:

1. A portable blind comprising,
   a collapsible frame means comprising first and second normally horizontally spaced apart frames, support means secured to and extending between said first and second frames to maintain said frames in their spaced apart relationship,
   means on said frame means for supporting blind material thereon,
   said frames being movable from a normally assembled position to a folded position, said frames being sufficiently spaced apart to permit a person to position himself therebetween when said frames are in their assembled position,
   each of said frames comprising a bottom frame member having opposite ends, a normally upstanding back frame member pivotally connected at its lower end to one end of each bottom frame member, an inclined front frame member having upper and lower ends and being pivotally connected at its upper end to the upper end of said back frame member and pivotally connected at its lower end to the other end of said bottom frame member,
   a foldable seat secured to said back frame members and positioned therebetween,
   and an elongated flexible member secured to and extending between said back frame members to provide a back rest for said foldable seat.

2. A portable blind comprising,
   a collapsible frame means comprising first and second normally horizontally spaced apart frames, support means secured to and extending between said first and second frames to maintain said frames in their spaced apart relationship,
   means on said frame means for supporting blind material thereon,
   said frames being movable from a normally assembled position to a folded position, said frames being insufficiently spaced apart to permit a person to position himself therebetween when said frames are in their assembled position,
   said blind material comprising flexible material secured to said frame means, said flexible material and said frame means defining closed back and opposite side portions and a closable front and top portion.

3. The portable blind of claim 2 wherein said closable front and top portions have quick releasable means thereon for quickly opening said top portion and at least a portion of said front portion.

4. A portable blind comprising,
a frame means comprising first and second normally horizontally spaced apart frames,
blind material on said frame means defining opposite side blind portions, a back blind portion and a front blind portion,
said front blind portion being selectively closable to permit ingress into and egress out of said blind,
means on said front blind portion for quickly opening at least a portion of said front blind portion to permit the hunter to shoot from the blind,
said front blind portion comprising a pair of closable flap members at its lower end and a slidable top portion slidably mounted on said frame means and moveable between closed and opened positions on said frame means.

5. The portable blind of claim 4 wherein said slidable top portion has resilient means secured thereto which yieldably resists the closing of said top portion and which causes said top portion to quickly move to its open position at times.

6. The portable blind of claim 5 wherein the upper ends of said closable flap members have registering grommets provided thereon, an arcuate hook means on said top portions adapted to be connected to said grommets, the engagement of said hook means with said grommets maintaining said flap members and said top portion in their closed position.

7. A portable blind comprising,
a frame means comprising first and second normally horizontally spaced apart frames,
blind material on said frame means defining opposite side blind portions, a back blind portion and a front blind portion,
means on said front blind portion for quickly opening at least a portion of said front blind portion to permit the hunter to shoot from the blind,
said front blind portion comprising a slidable top portion slidably mounted on said frame means and moveable between closed and opened positions on said frame means,
said slidable top portion having resilient means secured thereto which causes said top portion to quickly move to its open position.

8. A portable blind comprising,
a collapsible frame means comprising first and second normally horizontally spaced apart frames,
support means secured to and extending between said first and second frames to maintain said frames in their spaced apart relationship,
means on said frame means for supporting blind material thereon,
said frames being movable from a normally assembled position to a folded position, said frames being sufficiently spaced apart to permit a person to position himself therebetween when said frames are in their assembled position,
said frames having a vertical height greater than the height of a person in a sitting position,
each of said frames comprising a bottom frame member having opposite ends, a normally upstanding back frame member pivotally connected at its lower end to one end of each bottom frame member, an inclined front frame member having upper and lower ends;
each of said inclined front frame members comprising upper and lower frame member portions, said upper frame member portions being pivotally connected at their upper ends to the upper end of said back frame member, said lower frame member portions being pivotally connected at their lower ends to the other end of said bottom frame member, and means selectively connecting the upper ends of said lower frame member portions to the lower ends of said upper frame member portions to maintain the same in substantial alignment when said frames are in their assembled position.

9. The portable blind of claim 8 wherein said means selectively connecting the upper ends of said lower frame members portions to the lower ends of said upper frame members portions comprises a sleeve means slidably mounted thereon and extending therebetween.

10. The portable blind of claim 8 wherein a foldable seat is secured to said back frame members and is positioned therebetween, said foldable seat comprising a first support member secured to and extending between said back frame members above the lower ends thereof; a U-shaped support member pivotally operatively connected at its ends to the lower ends of said back frame members; and a flexible member secured to said first support member and said U-shaped support member and extending therebetween.

* * * * *